Figure 1:
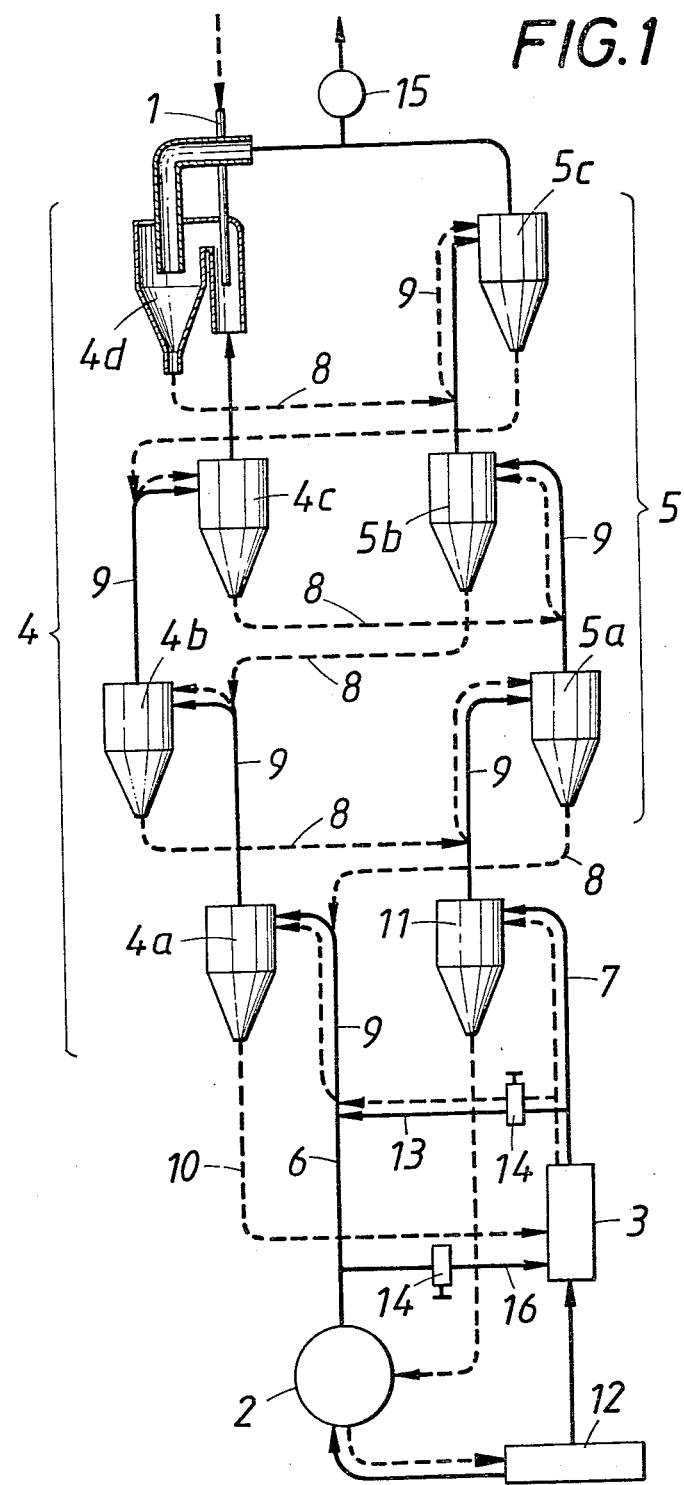

United States Patent [19]

Feige et al.

[11] 4,431,453
[45] Feb. 14, 1984

[54] PROCESS AND APPARATUS FOR PRODUCING HYDRAULIC CEMENT

[75] Inventors: Fritz Feige, Dessau, German Democratic Rep.; Franz Krennbauer, Linz, Austria

[73] Assignee: Voest-Alpine Aktiengesellschaft, Linz, Austria

[21] Appl. No.: 434,501

[22] Filed: Oct. 15, 1982

[30] Foreign Application Priority Data

Oct. 27, 1981 [DD]  German Democratic Rep. ... 234385
Nov. 13, 1981 [AT]  Austria .................................. 4882/81

[51] Int. Cl.³ .............................................. C04B 7/44
[52] U.S. Cl. ...................................... 106/100; 432/14; 432/106
[58] Field of Search .................... 106/100; 432/14, 106

[56] References Cited

U.S. PATENT DOCUMENTS 4,318,745  3/1982  Kraus .................................. 106/100

FOREIGN PATENT DOCUMENTS

| | | |
|---|---|---|
| 2534498 | 2/1976 | Fed. Rep. of Germany ...... 106/100 |
| 2618489 | 11/1976 | Fed. Rep. of Germany ...... 106/100 |
| 2716454 | 11/1977 | Fed. Rep. of Germany ...... 106/100 |
| 2712239 | 9/1978 | Fed. Rep. of Germany ...... 106/100 |
| 2931590 | 2/1980 | Fed. Rep. of Germany ...... 106/100 |
| 3037929 | 5/1981 | Fed. Rep. of Germany ...... 106/100 |
| 2344056 | 7/1981 | Fed. Rep. of Germany ...... 106/100 |

*Primary Examiner*—James Poer
*Attorney, Agent, or Firm*—Kurt Kelman

[57] ABSTRACT

In the production of cement, the ground raw material is de-acidified in a calcinator and subsequently burnt in a kiln and before being de-acidified in the calcinator is preheated by a multistage heat exchange with exhaust gas streams coming from the kiln and from the calcinator, respectively, and conducted in two parallel series of heat exchange stages. Up to the heat exchange stage which directly precedes the calcinator and receives the exhaust gas stream from the kiln, the stream of ground raw material is conducted from each heat exchange stage of one series to a heat exchange stage of the other series. In order to provide equal conditions in both series of exhaust gas-handling heat exchange stages, part of the hot exhaust gas stream from the calcinator is admixed to the hot exhaust gas stream from the kiln before or adjacent to that heat exchange stage which directly precedes the calcinator.

11 Claims, 2 Drawing Figures

PROCESS AND APPARATUS FOR PRODUCING HYDRAULIC CEMENT

This invention relates to a process of producing hydraulic cement, wherein the ground raw material is deacidified in a calcinator and subsequently burnt in a kiln and before being de-acidified in the calcinator is preheated by a multistage heat exchange with two exhaust gas streams which are conducted from the kiln and from the calcinator, respectively, in two series of heat exchange stages, the stream of ground raw material is passed in alternation from a heat exchange stage of one exhaust gas stream to a heat exchange stage of the other exhaust gas stream until the stream of ground raw material has reached the heat exchange stage which immediately precedes the calcinator and is connected to receive the exhaust gas stream from the kiln, and to apparatus for carrying out the process.

In order to improve the de-acidification in the calcinator by a reduction of the carbon dioxide partial pressure and to improve the preheating the ground raw material mixture before it enters the calcinator, it is known from Laid-open German Application No. 29 31 590 to supply the calcinator with the cooling air which has been heated by the cooling of the burnt cement clinker rather than with the exhaust gas from the kiln, to conduct the exhaust gas streams from the kiln and from the calcinator, respectively, in two separate, parallel series of heat exchange stages of a multistage heat exchanger, and to conduct the stream of ground raw material in alternation from a heat exchange stage of one series to a heat exchange stage of the other series until the calcinator is reached. As a result of these measures, the exhaust gases from the kiln cannot have a disturbing influence on the de-acidification of the ground raw material in the calcinator and the stream of ground raw material before entering the calcinator is preheated to a higher temperature than when the exhaust gases are conducted in a single line, because the exhaust gas from the kiln is at a higher temperature than the exhaust gas from the calcinator.

But that known process has the disadvantage that the ground raw material must be charged to the heat exchanger in two partial streams at a controlled ratio in order to ensure that the two exhaust gas streams at the cold end of the heat exchanger will be at approximately the same temperatures. Whereas these partial streams of ground raw material are subsequently recombined and are jointly conducted between the heat exchange stages of the two series, this conducting of the ground raw material involves a higher expenditure. Besides, separate blowers must be used for the two exhaust gas lines because the exhaust gas temperatures and pressures are different. A further disadvantage resides in that the heat exchange units of the two series have different dimensions because exhaust gas at a higher rate becomes available in the line which is connected to the calcinator. Moreover, the concentration of cakable ballast in the exhaust gas from the kiln may require special measures in order to prevent a caking in the heat exchange stages and in the conduits.

It is an object of the invention to avoid these disadvantages and so to improve a process of the kind described first hereinbefore for the production of hydraulic cement that the equipment expenditure will be greatly reduced and the danger of a caking of ballast contained in the exhaust gas from the kiln can be substantially avoided.

This object is accomplished according to the invention in that part of the hot exhaust gas stream from the calcinator is admixed to the hot exhaust gas stream from the kiln before or adjacent to the heat exchange stage which directly precedes the calcinator.

Because part of the exhaust gas stream from the calcinator is admixed to the exhaust gas stream from the kiln, equal exhaust gas rates can be ensured for both series of heat exchange stages so that like heat exchange units can be used in both said series and equal conditions in said series can be provided. This will reduce the equipment expenditure and improve the thermal efficiency because under conditions which are equal in other respects the exit temperature of the exhaust gas streams depends on the mass ratio of ground raw material to exhaust gas and the entire ground raw material stream can be charged to one heat exchange unit of the heat exchanger without being divided. Because the conditions in the two series are substantially the same, a common blower can be used for both series. Besides, the admixing of part of the exhaust gas stream from the calcinator to the exhaust gas stream from the kiln reduces the concentration of ballast in the exhaust gas from the kiln so that the tendency of the ballast to cake is greatly reduced.

Equal conditions in both series of heat exchange stages can be obtained in a particularly desirable manner if, according to a further feature of the invention, part of the hot exhaust gas stream from the kiln is supplied to the calcinator before part of the exhaust gas stream from the calcinator is admixed to the exhaust gas stream from the kiln. As a result, the series of heat exchange stages arranged to receive exhaust gas from the calcinator conducts also mixed exhaust gases so that the ballast concentration will be further reduced. Besides, the exhaust gas partial stream supplied to the calcinator may be controlled in such a manner that constant conditions for the preheating and the preliminary de-acidification of the ground raw material will be ensured even when variations of the kiln operation result in changes of the rate and temperature of the exhaust gas from the kiln. Because only a partial stream of the exhaust gases from the kiln is supplied to the calcinator and a major portion of the gas stream supplied to the calcinator consists of preferably preheated air, the detrimental influence of the exhaust gas from the kiln on the calcining operation is not significant in practice.

To permit a utilization of the higher temperature of the exhaust gases from the kiln for preheating the ground raw material to a higher temperature, the ground raw material can be supplied to the hot exhaust gas stream from the kiln before the heat exchange stage which directly precedes the calcinator and before the exhaust gas stream from the kiln is admixed to the partial stream of exhaust gas from the calcinator. Together with the mixed stream, which is at a lower temperature than the exhaust gas from the kiln, the ground raw material is supplied to that heat exchange unit which is the last in the direction of flow of the ground raw material before the latter enters the calcinator.

If, in another embodiment of the invention, the hot partial stream of exhaust gas from the calcinator is added to the exhaust gas stream from the kiln before the ground material is removed from the exhaust gas coming from the calcinator, a partial stream of the ground material together with the partial stream of exhaust gas from the calcinator is supplied to the heat exchange stage which directly precedes the calcinator and from which the ground material which has already passed through the calcinator is supplied to the calcinator together with the remaining ground raw material so that the residence time of said material and the degree to which it is de-acidified are increased. As a result, a higher de-acidification in the calcinator permits the use of a smaller kiln or a given de-acidification can be effected in a smaller calcinator. As the de-acidification is known to depend also in the particle size of the ground raw material, a suitable separation may be carried out to ensure that mainly the large particles of the ground material are circulated so that the course and fine particles entering the kiln have been de-acidified to the same degree.

The process according to the invention may be carried out by an apparatus which comprises a kiln for burning the de-acidified ground material, a calcinator preceding the kiln, and a multistage heat exchanger, which precedes the calcinator and has heat exchange units connected in two parallel series, which are connected to the exhaust gas lines from the kiln and from the calcinator, respectively, wherein the ground raw material outlet of each heat exchange unit of each series is connected to the ground raw material inlet of a heat exchange unit of the other series. To permit a supply of part of the exhaust gas stream from the calcinator to the exhaust gas stream from the kiln, the exhaust gas line from the calcinator is connected to the exhaust gas line from the kiln by a branch duct, which is provided with a valve, such as a gate valve. By means of the valve, the rate at which the partial stream of exhaust gas is supplied to the exhaust gas from the kiln can be controlled.

If the exhaust gas line from the kiln is connected to the calcinator by a connecting duct which incorporates a control valve and precedes the branch duct in the direction of flow of the exhaust gas, hot exhaust gas from the kiln can be supplied to the calcinator. This ensures that a stream of mixed exhaust gases will flow through the series of heat exchange units which are associated with the exhaust gas line from the calcinator, so that the content of cakable ballast will be reduced in both exhaust gas lines and equal conditions will be ensured in both exhaust gas lines.

The exhaust gas stream from the kiln may be mixed with part of the exhaust gas stream from the calcinator in a different manner in that the calcinator is provided in an intermediate portion of its height with a tangential discharge conduit for discharging ground material and part of the exhaust gas stream and is provided in its upper portion with an exhaust gas duct which opens into the next preceding heat exchange unit in the direction of flow of ground raw material, and the exhaust gas line from the kiln is connected to the calcinator above the discharge duct. These measures may be adopted to ensure a rapid mixing of the exhaust gas stream from the kiln and of the partial exhaust gas stream from the calcinator when the ground material has been removed from said partial stream. This will be of great importance particularly when the discharge duct from the last but one heat exchange unit in the direction of flow of the ground raw material opens into the exhaust gas line from the kiln before the calcinator in the direction of flow of the exhaust gas from the kiln. The ground raw material which is entrained into the upper portion of the calcinator by the exhaust gas from the kiln will then be thoroughly mixed with the exhaust gas stream outside the last heat exchange unit so that the heat transfer and the thermal efficiency will be improved.

Figure 2:
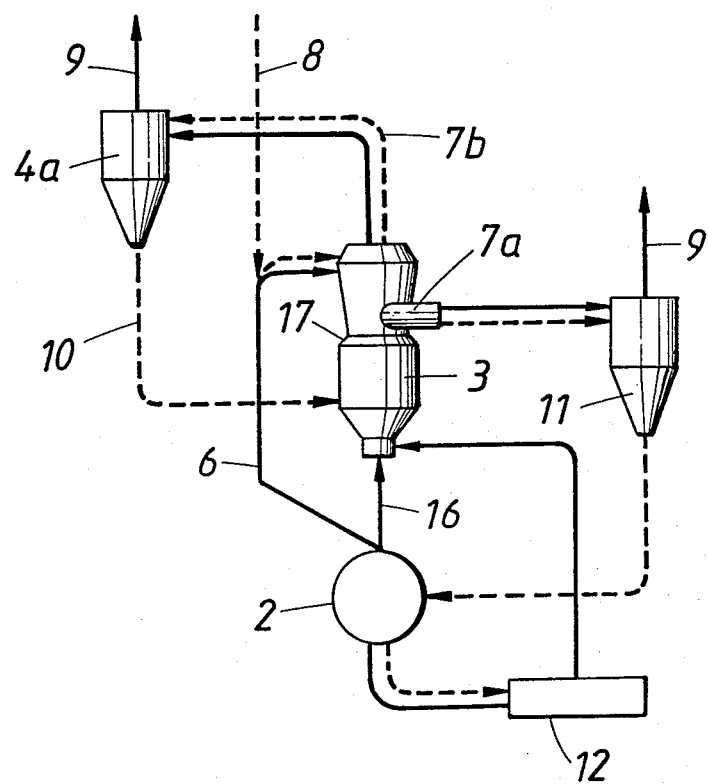

Apparatus for carrying out a process according to the invention for the production of cement is shown by way of example on the drawing, in which FIG. 1 is a block diagram showing apparatus according to the invention and FIG. 2 is a block diagram showing a modified apparatus according to the invention.

The flow paths for the ground material are indicated by dotted lines. Ground raw material is supplied by a feed line 1 to a multistage heat exchanger, which is heated by the exhaust gases from a rotary kiln 2 used to burn preheated and calcined ground material, and by the exhaust gases from a calcinator 3, which precedes the rotary kiln. In accordance with FIG. 1, that heat exchanger comprises two parallel series 4 and 5 of heat exchange units 4a, 4b, 4c, 4d of heat exchange units 5a, 5b, 5c. These heat exchange units consist of cyclones.

As is apparent from the flow paths for the exhaust gas streams, which are indicated by solid lines, the series 4 and 5 of heat exchange units are respectively connected to the exhaust gas lines 6 and 7 from the rotary kiln 2 and from the calcinator 3. By the exhaust gases from the rotary kiln 2 and from the calcinator 3, the ground raw material is heated in stages as it flows through heat exchange units of the two series 4 and 5 in alternation because the outlet 8 of each heat exchange unit of each series is connected to the inlet 9 of a heat exchange unit of the other series except for the heat exchange unit 4a, which has an outlet 10 connected to the calcinator 3. The ground material which has been de-acidified in the calcinator 3 is entrained by the exhaust gas stream from the calcinator and is supplied to a separator 11, in which the ground material is separated from the exhaust gas stream and is subsequently supplied to the rotary kiln. The additional heat required for the de-acidification is generated by the combustion of fuel in the calcinator. The combustion air which is used consists preferably of part of the heated cooling air from a cooler 12, which succeeds the rotary kiln 2 and in which the ground material is cooled after it has been burnt in the kiln 2 to form cement clinker. Another part of the cooling air from the cooler 12 is supplied as combustion air to the rotary kiln 2.

The apparatus according to the invention shown in FIG. 1 differs from known apparatus in that the exhaust gas line 7 from the calcinator 3 is connected to the exhaust gas line 6 from the rotary kiln 2 by a branch duct 13, which incorporates a gate valve 14 for controlling the flow rate. As the branch duct 13 precedes the separator 11 in the direction of flow of the ground material, part of the ground material which has been de-acidified in the calcinator 3 is entrained by the partial stream of exhaust gas from the calcinator 3 and added to the exhaust gas stream from the rotary kiln and then enters the heat exchange unit 4a directly preceding the calcinator 3. This part of the ground material is thus recycled to the calcinator 3 so that its residence time in the calcinator and the degree of de-acidification are correspondingly increased. If such a recycling of part of the ground material is not desired, the branch duct 13 may succeed the separator 11 in the exhaust gas line 7 from the calcinator 3. In that case the advantage which is afforded resides only in that part of the exhaust gas stream from the calcinator is admixed to the exhaust gas from the kiln so that exhaust gases at equal rates may be handled in the two series 4 and 5 of heat exchange units as flow rate of exhaust gas from the kiln is only about two-thirds of the flow rate of exhaust gas from the calcinator.

If equal conditions are thus obtained in both series 4 and 5 of heat exchange units, equal heat exhaust units can be used in the two series 4 and 5 and can be connected to a common exhaust gas blower 15.

Another advantage afforded by the described conducting of the exhaust gases resides in that the concentration of cakable ballast in the exhaust gases from the kiln is reduced by the admixing of part of the exhaust gas stream from the calcinator 3. This result can be further increased in that the exhaust gas line 6 from the kiln 2 is connected to the calcinator 3 by an additional connecting duct 16, which precedes the branch duct 13 in the direction of flow and can be used to supply hot exhaust gas from the kiln to the calcinator. The rate at which exhaust gas from the kiln 2 is supplied to the calcinator 3 can be controlled as required by a gate valve 14. The connecting duct 16 ensures that the series 5 connected to the exhaust gas line from the calcinator conduts also mixed exhaust gases so that the equality of the operating conditions in the two series 4 and 5 of heat exchange units is further improved.

It will be understood that the connecting duct 16 may be used to supply flue gas from the calcinator 3 to the rotary kiln 2 if part of the exhaust gas from the kiln must be withdrawn in exceptional cases in order to avoid an excessive pollution.

The apparatus shown in FIG. 2 differs from that shown in FIG. 1 in that the calcinator 3 is provided in its middle portion, above a constriction 17, with a tangential discharge duct 7a for supplying the stream of ground material and part of the stream of exhaust gas to the separator 11, from which the exhaust gas stream from the calcinator is supplied to the series 5 of heat exchange units whereas the ground material which has been collected is delivered to the kiln 2. By means of the exhaust gas line 6, to which the discharge duct 8 from that heat exchange unit 5a is connected which is the last but one in the direction of flow of the ground raw material (see FIG. 1), the exhaust gas from the kiln is supplied to the calcinator 3 above the discharge conduit 7a and in the calcinator is quickly and thoroughly mixed with a partial stream of exhaust gas from the calcinator from after the ground material has been removed. The stream of mixed exhaust gases and the ground raw material are then supplied by the exhaust gas duct 7b to the final heat exchange unit 4a, which directly precedes the calcinator so that the sensible heat of the exhaust gas streams can be utilized in a particularly desirable manner.

In order to ensure a uniform division of the exhaust gas streams to the two series 4 and 5 of heat exchange units, part of the exhaust gas from the kiln can be directly supplied to the calcinator 3 by a branch duct 16. It will be understood that suitable control means for a control of the several gas streams are provided but are not shown here for the sake of clearness.

What is claimed is:

1. In a process of producing hydraulic cement, comprising de-acidifying ground raw material in a calcinator to produce de-acidified ground material and calcinator exhaust gas, burning said de-acidified ground material in a kiln to produce cement clinker and kiln exhaust gas, causing kiln exhaust gas to flow from said kiln through a first series of heat exchange stages, causing calcinator exhaust gas to flow from said calcinator through a second series of heat exchange stages, causing said ground raw material to flow through said heat exchange stages of said first and second series in heat exchange relation to said kiln exhaust gas and calcinator exhaust gas, whereby said ground raw material is preheated delivering said ground raw material from a final heat exchange stage of said first series to said calcinator, and conducting kiln exhaust gas from said kiln through said final heat exchange stage and then through the remaining heat exchange stages of said second series, the improvement residing in that said calcinator exhaust gas is divided into first and second partial streams of calcinator exhaust gas, said first partial stream of calcinator exhaust gas is conducted through said second series of heat exchange stages, said second partial stream of calcinator exhaust gas is admixed to said kiln exhaust gas to produce mixed exhaust gases and said mixed exhaust gases are conducted through at least part of said final heat exchange stage in heat transfer relation with said ground raw material.

2. The improvement set forth in claim 1, wherein
said second partial stream of calcinator exhaust gas is admixed to said kiln exhaust gas before the latter enters said final heat exchange stage.

3. The improvement said forth in claim 1, wherein
said kiln exhaust gas is divided into first and second partial streams of kiln exhaust gas between said kiln and said final heat exchange stage, said first partial stream of kiln exhaust gas is delivered to said final heat exchange stage, said second stream of kiln exhaust gas is delivered to said calcinator, and said second partial stream of calcinator exhaust gas is admixed to said first partial stream of kiln exhaust gas.

4. The improvement set forth in claim 1, wherein
ground raw material which has flown through all of said heat exchange stages except said final heat exchange stage is added to said kiln exhaust gas between said kiln and said final heat exchange stage, and said second stream calcinator exhaust gas is admixed to said kiln exhaust gas after said ground raw material has been added to said kiln exhaust gas.

5. The improvement set forth in claim 1, wherein
de-acidified ground material is entrained by said calcinator exhaust gas and is separated therefrom and said calcinator exhaust gas is divided into said first and second partial streams of calcinator exhaust gas after said de-acidified ground material has been separated therefrom.

6. In apparatus for producing cement, comprising
a calcinator for de-acidifying ground raw material and for producing de-acidified ground material and calcinator exhaust gas, a kiln for burning said de-acidified ground material and for producing cement klinker and kiln exhaust gas, a heat exchanger comprising first and second series of heat exchange units, kiln exhaust gas line means connected to said kiln and arranged to conduct kiln exhaust gas from said kiln through said first series of heat exchange units, a calcinator exhaust gas line connected to said calcinator and arranged to conduct calcinator exhaust gas from said calcinator through said second series of heat exchange units, duct means for conducting said ground raw material through said heat exchange units in heat exchange relation with said calcinator exhaust gas and kiln exhaust gas to preheat said ground material, said heat exchange units including a final heat exchange unit connected to said calcinator and arranged to deliver said ground raw material to said calcinator, said duct means comprising means for delivering said ground raw material from each heat exchange unit of one of said series to a heat exchange unit of the other of said series before said final heat exchange unit, said kiln exhaust gas line means being arranged to conduct kiln exhaust gas from said kiln through said final heat exchange unit and thereafter through the remaining heat exchange units of said first series, said final heat exchange unit having a kiln gas outlet, the improvement residing in that admixing means are provided for admixing part of said calcinator exhaust gas to said kiln exhaust gas before said kiln gas outlet to produce mixed exhaust gases, whereby said mixed exhaust gases are conducted through at least part of said final heat exchange unit in heat transfer relation with said ground raw material.

7. The improvement set forth in claim 6, wherein
said admixing means comprise a branch duct, which is connected at one end to said calcinator exhaust gas line between said calcinator and said second series of heat exchange units and at the other end to said kiln exhaust gas line means before said exhaust gas outlet of said final heat exchange unit, and
a valve for controlling the rate of flow in said branch duct is incorporated in the latter.

8. The improvement set forth in claim 7, wherein said valve consists of a gate valve.

9. The improvement set forth in claim 7, wherein
a connecting duct is connected at one end to said calcinator and at the other end to said kiln exhaust gas line means between said kiln and said other end of said branch duct.

10. In apparatus for producing cement, comprising
a calcinator for de-acidifying ground raw material and for producing de-acidified ground material and calcinator exhaust gas,
a kiln for burning said de-acidified ground material and for producing cement klinker and kiln exhaust gas,
a heat exchanger comprising first and second series of heat exchange units,
kiln exhaust gas line means connected to said kiln and arranged to conduct kiln exhaust gas from said kiln through said first series of heat exchange units,
a calcinator exhaust gas line connected to said calcinator and arranged to conduct calcinator exhaust gas from said calcinator through said second series of heat exchange units,
duct means for conducting said ground raw material through said heat exchange units in heat exchange relation with said calcinator exhaust gas and kiln exhaust gas to preheat said ground material, said heat exchange units including a final heat exchange unit connected to said calcinator and arranged to deliver said ground raw material to said calcinator,
said duct means comprising means for delivering said ground raw material from each heat exchange unit of one of said series to a heat exchange unit of the other of said series before said final heat exchange unit,
said kiln exhaust gas line means being arranged to conduct kiln exhaust gas from said kiln through said final heat exchange unit and thereafter through the remaining heat exchange units of said first series,
said calcinator exhaust gas line comprises a tangential discharge duct connected to said calcinator in an intermediate portion of its height and arranged to discharge calcinator exhaust gas and de-acidified ground material entrained by said calcinator exhaust gas from said calcinator and to deliver calcinator exhaust gas to said second series of heat exchange units, and
said kiln exhaust gas line means and admixing means comprise a first duct extending from said kiln and connected to said calcinator above said tangential discharge duct, and
said kiln exhaust gas line means comprise a second duct connected to said calcinator above said first duct and extending to said final heat exchange unit and arranged to deliver said mixed exhaust gases from said calcinator to said final heat exchange stage.

11. The improvement set forth in claim 10, wherein
the last heat exchange unit of said second series in the direction of flow of said ground raw material has a ground raw material outlet connected to said first duct.

* * * * *

UNITED STATES PATENT AND TRADEMARK OFFICE
CERTIFICATE OF CORRECTION

PATENT NO. : 4,431,453
DATED : FEBRUARY 14, 1984
INVENTOR(S) : FEIGE ET AL

It is certified that error appears in the above—identified patent and that said Letters Patent is hereby corrected as shown below:

Cover page, item [73], insert after first assignee's name address --and VEB Schwermaschinenbau-Kombinat "Ernst Thälmann" Magdeburg, Magdeburg, German Democratic Republic--.

Signed and Sealed this

Seventh Day of August 1984

[SEAL]

Attest:

GERALD J. MOSSINGHOFF

Attesting Officer

Commissioner of Patents and Trademarks